June 6, 1944.  A. J. HORNFECK  2,350,329
TEMPERATURE MEASURING APPARATUS
Filed Dec. 30, 1939  2 Sheets-Sheet 2
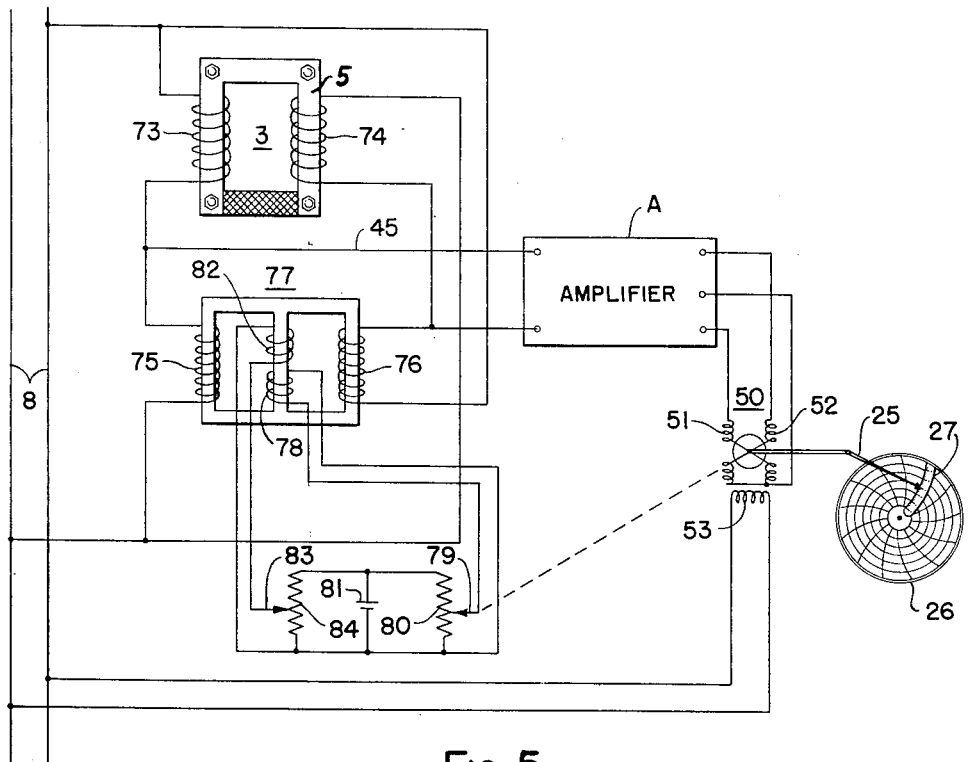
FIG. 5
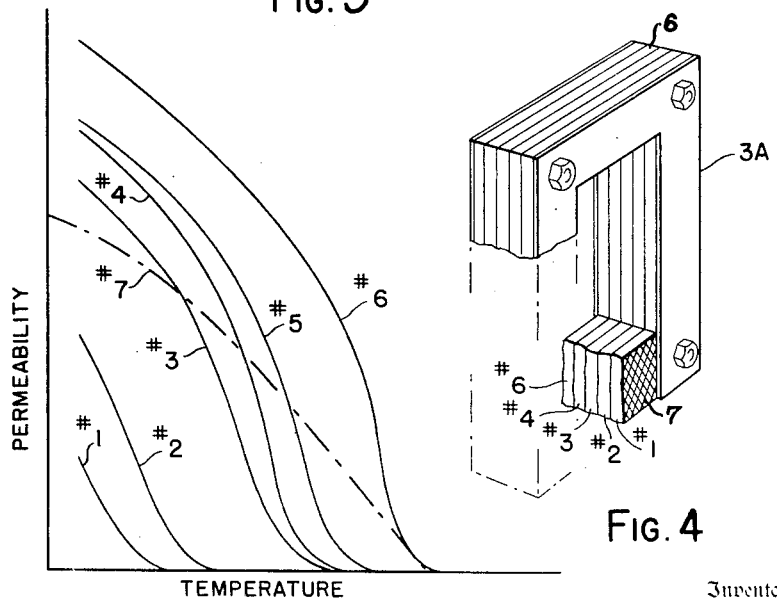
FIG. 3
FIG. 4
Inventor
ANTHONY J. HORNFECK
By Raymond D. Junkins
Attorney Patented June 6, 1944

2,350,329

UNITED STATES PATENT OFFICE 2,350,329

TEMPERATURE MEASURING APPARATUS

Anthony J. Hornfeck, Cleveland, Ohio, assignor to Bailey Meter Company, a corporation of Delaware Application December 30, 1939, Serial No. 311,729

11 Claims. (Cl. 73—362)

This invention relates to apparatus for measuring temperature, and more particularly to that type of system wherein variations in temperature are translated into corresponding changes in an electrical effect and the magnitude of that effect measured.

In devices of this general type heretofore available either the electrical effect produced was of such minute quantity as to require complicated and delicate amplifying means; or considerable energy was consumed by the device if operated at a high energy level which produced self-heating or other deleterious effects, thereby jeopardizing its accuracy and requiring a device of such size as to preclude its use in commercial practice.

An object of my invention is therefore to provide a device wherein unit changes in temperature produce corresponding and relatively large variations in an electrical effect which may be measured directly as by means of a milliammeter or other standard instrument; or if amplification is desired, the amplifying means may be of a simple and rugged construction.

It is a further object to provide a device which does not consume appreciable energy in producing the electrical effect, thereby avoiding self-heating and making it possible to operate the device at a high energy level.

Another object of my invention is to provide a simple and rugged device which will withstand the ordinary handling and conditions met with in commercial practice without failure or loss of accuracy.

Still a further object is to provide a device which is readily adapted to the measurement of temperature wherein the energy is transmitted to the device either by conduction, convection or radiation.

Another object is to provide a device having a relatively small mass and high rate of heat transmission so that variations in temperature are immediately translated into corresponding changes in the electrical effect.

In the drawings:

Fig. 3 illustrates characteristic curves of permeability v. temperature for various temperature-sensitive magnetic alloys.

Fig. 4 illustrates a modified form of temperature sensitive element.

Fig. 5 illustrates a further form of my invention.

Figure 1:
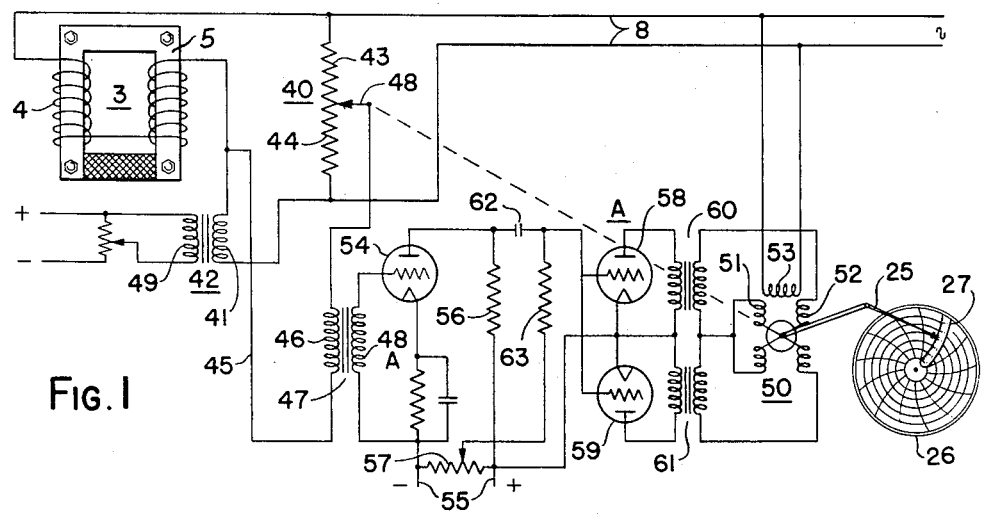
Fig. 1 is a diagrammatic illustration of one form of my invention.

Referring to Fig. 1, I therein show my invention arranged to indicate and record temperature through the agency of a temperature sensitive element 3. The element 3, comprises a coil 4 and a core piece 5 disposed in the magnetic field produced by current in the coil. The core piece 5 is composed of a plurality of closely clamped U-shaped laminations 6 (Fig. 4) having a substantially constant electrical permeability regardless of changes in temperature. The open ends of the laminations 6 are closed by a plurality of laminations 7 made of a metallic alloy having an electrical permeability varying with temperature. Such a metallic alloy may for example be composed of nickel and iron; or nickel, iron and manganese; or nickel, iron and chromium in varying percentages.

The permeability of such an alloy varies in functional relation with temperature. By varying the portion of the core piece 5 made of the metallic alloy laminations I may vary the relation between unit changes in temperature and corresponding changes in permeability. For example, in some instances I may find it desirable to fabricate the entire core from laminations of the metallic alloy. However, I usually find it preferable to construct the core 5 partially of laminations which have a substantially constant permeability regardless of temperature changes and partially of metallic alloy laminations which, as previously stated, have a marked change in permeability with changes in temperature.

A characteristic of the type of alloy I employ is that the temperature at which the alloy becomes non-magnetic depends upon the elements going into the alloy and the proportion of the elements. In Fig. 3 I illustrate a typical group of characteristic curves of temperature v. permeability for various temperature-sensitive magnetic alloys. Curves #1, #2, #3, #4, #5, and #6 are each the curve of temperature v. permeability produced by an alloy having a certain composition. In general, I find it possible to vary the characteristic curve by varying the relative percentage of the metallic elements entering into the alloy.

The particular alloy I select for any given application will be determined by the maximum and minimum temperatures and the range of temperatures. Thus if the element 3 is to measure relatively low temperatures over a small range I may use an alloy giving the characteristic curve #1; whereas if the temperatures are relatively high I may use an alloy giving the characteristic curve #6.

In some applications there is an advantage in having a relatively large change in permeability per unit change in temperature, as for example where the range in temperatures to be encountered is relatively small. In other applications this is a disadvantage, for the exhibiting means may be overdeflected within the normal variations in temperature experienced. By my invention I am able to take care of either contingency, that is I may cause a unit change in temperature to produce a relatively small or relatively great change in permeability as may be desired.

It will be noted that a characteristic of the temperature-sensitive magnetic alloys is that each alloy has a particular range of relatively small magnitude over which its permeability varies with temperature, and above and below this range its permeability is substantially constant regardless of change in temperature. Utilizing one alloy alone, the element 3 may therefore be used to give a relatively large change in permeability per unit change in temperature, and may therefore be used where it is desired to exhibit the range and temperatures, say, in the order of 100° F. The particular point in the temperature scale at which that range occurs will, of course, determine at least in part the alloy selected as previously described. To obtain the temperature element giving a relatively small change in permeability per unit change in temperature I may combine several alloys into a single element, so that the permeability of the element will vary over a wide range. Thus in Fig. 4 I show an element 3a having temperature-sensitive magnetic allow laminations #1, #2, #3, #4, and #6 having temperature - permeability characteristics corresponding to curves #1, #2, #3, #4, and #6 respectively of Fig. 3. By so combining in a single element different alloys in varying amount I may produce substantially any temperature v. permeability curve desired over any practical temperature range. Thus the combination illustrated as an example may give a resultant temperature v. permeability characteristic as shown by curve #7 in Fig. 3. It will be noted that this resultant curve is substantially a straight line and the limits extend beyond the practical limits of any curve corresponding to a single alloy.

In Fig. 1 I show an embodiment of my invention wherein the element 3 is connected in a bridge network normally in balance, but which changes in temperature unbalance. Such unbalance effects operation of a motor in one direction or another, which motor through a suitable tie-back rebalances the bridge. As evident, the position of the motor thereby becomes a measure of the temperature to which the element 3 is subjected, and may be further employed to operate suitable exhibiting means to provide a visual indication of the temperature.

Referring to Fig. 1, I therein show the element 3 connected in one arm of a bridge 40 having as other arms the output winding 41 of a saturable core reactor 42 and resistances 43 and 44. The alternating current source 8 is connected in one conjugate conductor of the bridge and in the other conjugate conductor 45 is the primary winding 46 of a transformer 47. The saturable core reactor 42 is provided with an adjustable direct current bias winding 49. As will be understood by those familiar with the art the bridge 40 may initially be brought to a balanced condition by proper adjustment of the bias winding 49.

The resistances 43 and 44 form one continuous resistance and the magnitude of each is determined by the position of a contact 48, to which the conjugate conductor 45 is connected. With the bridge in balance no current passes through the conjugate conductor 45. Upon the bridge becoming unbalanced in one direction, a voltage of a given phase with respect to that of the source 8 will exist in the conjugate conductor 45. An unbalance of the bridge in opposite sense will produce a reversal of phase. The arrangement is such that the contact 48 is positioned in one direction or the other selectively in accordance with the phase of the alternating current voltage in the conjugate conductor 45 to restore the bridge to balance.

The contact 48 is positioned by a motor 50 having opposed shading pole windings 51, 52 and an alternating current field winding 53 energized from the source 8. An alternating current voltage of one phase in the conjugate conductor 45 effects operation of the motor in one direction, and an alternating current voltage of opposite phase effects operation of the motor 50 in opposite direction. Advantageously I may so selectively control the operation of the motor 50 by means of an amplifier forming the subject matter of a patent to John D. Ryder No. 2,275,317 dated March 3, 1942. In Fig. 1 I have illustrated such an amplifier in detail. In other embodiments of my invention, which will be described hereinafter, I employ the same amplifier and have designated it wherever illustrated as amplifier "A".

The transformer 47 has a secondary 48A, the opposite terminals of which are connected to the cathode and grid of an electron discharge device 54. The output circuit of the device 54 is shown as including a source of direct current 55 and a resistance 56. If desired, the grid of the device 54 may be biased by means of a voltage divider 57 connected across the source 55, so that the device 54 is non-conducting or conducting a predetermined amount. When no current passes through the conjugate conductor 45 a direct current having no pulsating component may or may not flow through the output circuit of a device 54 depending upon the bias of its grid. Assuming now that alternating current is passing through the conjugate conductor 45, the current in the output circuit of the device 54 will become pulsating in character. The amplitude of the pulsations will depend upon the amount of current in the conjugate conductor 45, and the phase of the pulsations with respect to the pulsations of the source 8 will depend upon the phase of the voltage in the conjugate conductor 45.

The pulsating current passing through the output circuit of the device 54 is utilized to control the current transmission through a pair of electron discharge devices 58 and 59, the output circuits of which are inductively coupled through transformers 60 and 61 to the circuits of the pole windings 52 and 51 respectively. Such direct current as may normally flow through the output circuit of the device 54 will have no effect upon the potential impressed upon the grids of the devices 58 and 59 by virtue of a condenser 62. Upon passage of alternating current through the conjugate conductor 45 however, the pulsating component of the current induced in the output circuit of the device 54 will pass through the condenser 62 and render either device 58 or 59 conducting selectively in accordance with the phase of the voltage in the conjugate conductor 45.

The devices 58, 59 may normally be maintained non-conducting by connecting their grids through a resistance 63 to a suitable point on the voltage divider 57. To provide a high degree of sensitivity in some cases it may be preferable to maintain the devices 58, 59 normally conducting, which may be accomplished by suitably adjusting the potential of the grids. In the latter case a pulsating current originating due to current flow in the conjugate conductor 45 will selectively render one or the other of the devices 58, 59 more conducting and the other less conducting.

Selective control of the devices 58 and 59 is obtained by arranging them to have opposite polarity. That is when the anode of the device 58 is positive, the anode of the device 59 is negative, and vice versa. The pulsating current in the output circuit of the device 54 has a phase depending upon the phase of the voltage in the conjugate conductor 45. Thus upon the voltage in the conductor 45 being of one phase, the pulsating current will render the grid of the device 58 more positive with respect to its cathode during the same half cycle that its anode is positive, and hence the device will be rendered conducting. If the current in the conductor 45 is of opposite phase, the pulsating current in the output circuit of the device 54 will render the grid of the device 59 more positive with respect to its cathode during the same half cycle that its anode is positive, and hence the device will be rendered conducting. During the half cycle when the anodes of the devices 58 and 59 are negative with respect to their cathodes, both devices are of course non-conducting regardless of the potential of their grids.

When either the device 58 or 59 is rendered conducting, thereby short circuiting the secondary of the transformer 60 or 61, the impedance of the circuit of the pole windings 51 or 52 is sufficiently reduced to effect rotation of the motor 50 in one direction or the other. Such rotation as heretofore described positions the contact 48 and simultaneously therewith positions the index 25 relative to a graduated scale 27 and chart 26 to provide a visual indication and record of the temperature of the element 3.

Figure 2:
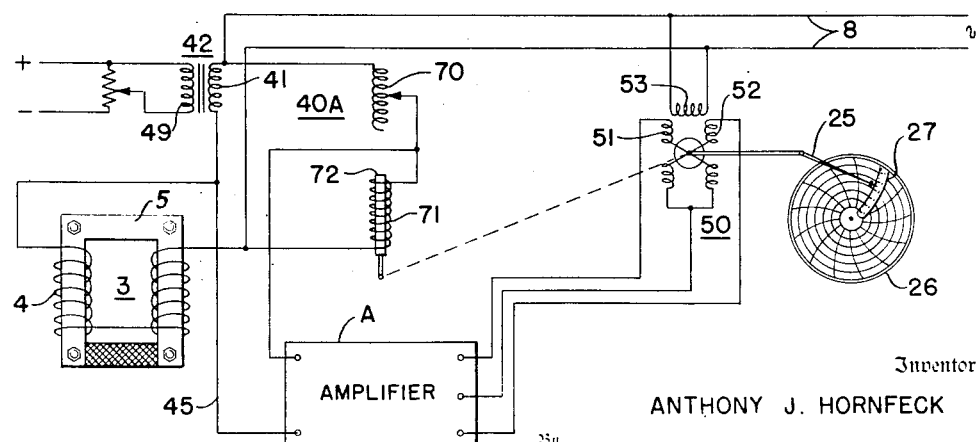
Fig. 2 illustrates another form of my invention.

In Fig. 2 I show a modified form of my invention somewhat similar to that shown in Fig. 1, but wherein I employ an impedance bridge which is maintained in balance by adjusting a variable inductance in acordance with, and in the same direction, to variations in inductance of the element 3.

Referring to Fig. 2, I therein show an impedance bridge 40A having as ratio arms the output winding 41 of the saturable core reactor 42, the winding 4 of the element 3, and adjustable inductance 70, and an inductance 71 the magnitude of which is determined by the position of a movable core 72. In one conjugate conductor of the bridge is connected the source of potential 8 and the other conjugate conductor 45 is connected into the amplifier A.

The movable core 72 is positioned by the motor 50. The bridge 40A may be initially balanced by proper adjustment of the control winding 49 of the reactor 42 and inductance 70. Thereafter upon a change in the inductance of the element 3 the resulting alternating current potential in the conjugate conductor 45 will effect, through the amplifier A, rotation of the motor 50 which will rebalance the bridge through positioning of the core 72, and simultaneously therewith indicate and record the change in inductance of the element 3.

In Fig. 5 I show a modified form of my invention wherein the element 3 is provided with two coils 73 and 74. The impedance of these coils is simultaneously varied by changes in the permeability of the element 3. The coils 73 and 74 are in diametrically opposite arms of an impedance bridge, the other arms of which comprise the reactance windings 75 and 76 of a saturable core reactor 77. The reactance winding 75 is in an arm of the bridge adjacent to that of the coil 73, which arm is diametrically opposite to that in which the reactance winding 76 is connected and which latter arm is adjacent to the arm in which the coil 74 is connected.

The source 8 is connected in one conjugate conductor of the bridge, and the other conjugate conductor 45 is connected to the amplifier A. Assuming the bridge to be in balance, no alternating current potential will exist in the conjugate conductor 45. A change in the permeability of the element 3 will however produce an alternating current potential in the conjugate conductor which will have a phase relationship with respect to the source 8 depending upon the sense of the change in permeability of the element 3. By providing the element 3 with windings 73, 74 connected in diametrically opposite arms of the bridge, a push-pull effect is produced which increases the magnitude of the potential in the conjugate conductor 45 over that which would have been produced for the same change in permeability of the element 3 if, for example, only a single coil 73 had been provided. The potential in the conjugate conductor 45, through amplifier A, produces operation of the motor 50 in direction depending upon the phase of the alternating current potential in the conjugate conductor 45 as heretofore described.

To rebalance the bridge after an unbalance occurring through a change in the permeability of the element 3, I show the saturable core reactor 77 provided with a direct current control winding 78, the energization of which is variable by the motor 50. In the specific arrangement shown the control winding 78 is connected to a contact 79 engaging a potentiometer 80 energized by a suitable source of direct current 81. The contact 79 is positioned along the potentiometer 80 by the motor 50, so that upon an unbalance of the bridge, due to a change in permeability of the element 3, consequent operation of the motor 50 will vary the energization of the control winding 78, and when the change in energization of the control winding 78 has been proportional to the change in permeability of the element 3, the bridge will be restored to balance.

To provide a means for initially balancing the bridge, I show the saturable core reactor 77 provided with a secondary control winding 82 connected to a contact 83 adjustable along a potentiometer 84 energized from the source 81. The adjustable contact 83 and associated potentiometer 84 affords a means for calibrating the system, that is, it provides a means whereby the index 25 may be brought to a desired position relative to the scale 27 and chart 26 when the element 3 is at some given temperature.

The embodiments of my invention so far illustrated and described while specifically not limited thereto, are particularly adapted to the measurement of temperature where heat transfer from and to the sensitive element occurs by convection and/or conduction. My invention, however, is equally applicable to the measurement of temperature wherein the heat transfer occurs by radiation.

Certain portions of my invention, disclosed but not claimed herein, are disclosed and claimed in my copending application Serial No. 506,631, filed on October 18, 1943, as a continuation-in-part of the present application.

Having now described certain preferred embodiments of my invention I desire it to be understood that I am not to be limited thereby other than as claimed in view of prior art.

Certain portions of the disclosure as filed in this parent application, but not claimed herein, have been divided out and form the basis for my copending continuation-in-part application Serial No. 506,631 filed October 18, 1943.

What I claim as new, and desire to secure by Letters Patent of the United States, is:

1. A temperature responsive device comprising a reactor including a pair of reactance windings, an impedance device including a pair of inductance coils, a balanceable bridge circuit including in each of two opposite arms a reactance winding of said reactor and in each of two other opposite arms an inductance coil of said impedance device, a control winding on the reactor and a source of direct current for energizing said control winding, a source of alternating current connected in one conjugate conductor of the bridge, said impedance device including a temperature sensitive magnetic alloy core piece inductively associated with the coils thereof and effective to unbalance the bridge when subjected to temperature variations, and means responsive to unbalance of the bridge connected in the other conjugate conductor for regulating the effectiveness of said control winding to rebalance the bridge.

2. A temperature responsive device comprising a balanceable bridge network including in each of two opposite arms a reactance winding, and in each of two other opposite arms an impedance coil, a source of alternating current in one conjugate conductor of the bridge for energizing the network, means associated with said impedance coils for simultaneously varying the impedance thereof in response to temperature changes, means associated with said reactance windings for simultaneously adjusting the impedance thereof to establish a balanced condition in the bridge corresponding to a predetermined temperature, and means in the other conjugate conductor of the bridge responsive to unbalance of the bridge for actuating said means for adjusting the impedance of said reactance windings to rebalance the bridge.

3. A temperature responsive device, in combination, a saturable core reactor comprising a magnetic core having two outer legs each in inductive relation with a reactance winding and a center leg in inductive relation with a control winding, a source of direct current potential for energizing said control winding, a balanceable bridge having four ratio arms, each of said reactance windings being included in an arm of the bridge, a temperature responsive impedance including an induction coil in each of the other arms of the bridge and having a temperature variable permeable core piece associated with the induction coils, a source of alternating current for energizing the bridge, means for establishing a condition of electrical balance in said bridge, and means responsive to unbalance of said bridge due to temperature change of said core piece for varying the current in the control winding to rebalance the bridge.

4. A temperature responsive and measuring device comprising a bridge network, a coil in one arm of said bridge, a core member for said coil having a permeability variable with temperature to thereby effect variations in impedance of said coil corresponding to changes in temperature of said core member, a balancing reactance of a fixed number of turns in another arm of said bridge, and means responsive to unbalance of said bridge for varying the inductance of said balancing reactance while maintaining the number of turns constant to restore said bridge to balance and measuring the amount of rebalancing necessary to rebalance said bridge.

5. A temperature measuring device comprising, a saturable core reactor having two reactance windings and a control winding, a source of direct current for energizing said control winding, a balanceable electrical network having four arms, two opposite arms of said network each including a reactance winding of said saturable core reactor and the remaining two opposite arms each including an inductance coil, a temperature-sensitive magnetic alloy core piece for said coils to simultaneously vary the impedance of said coils in accordance with changes in temperature to unbalance said network, a source of alternating current for energizing said electrical network, and means responsive to unbalance of said network for varying the energization of said control winding to rebalance said network and for indicating the temperature responsible for unbalancing said network.

6. A temperature measuring device comprising a saturable core reactor having two reactance windings and a direct current control winding, a source of direct current for energizing said control winding, a balanceable electrical network including two inductance coils and the reactance windings of said saturable core reactor, said inductance coils and reactance windings being arranged in opposed branches of said network, each branch including a coil and a winding in series, means for electrically balancing said network in accordance with a predetermined temperature, a temperature-sensitive magnetic alloy core piece for said inductance coils for varying the impedance thereof in accordance with variations in temperature to thereby upset the existing electrical balance of said network, a source of alternating current for energizing said network, and means responsive to unbalance of said network for varying the energization of said control winding to rebalance said network and for indicating the temperature responsible for unbalancing said network.

7. A temperature responsive device comprising a balanceable electrical network including a source of alternating current and an inductance coil, means to electrically balance said network, a temperature-sensitive magnetic alloy core piece for said coil to vary the impedance thereof in accordance with changes in temperature and thereby unbalance said network, said network including a branch circuit in which no current flows when the network is balanced, means included in said network for creating a potential difference between the ends of said branch circuit when the network is unbalanced due to temperature variations, means to cause the polarity of the resulting alternating current flowing in said network to vary relative to that of said source of alternating current in accordance with the sense of change in said temperature, means including electron discharge means for amplifying the magnitude of said branch potential, a pair of electron discharge devices each having an input and an output circuit, a motor having opposed pole circuits and an energizing alternating current field winding, an inductive coupling between each of said output circuits and one of said pole circuits, said output circuits arranged to have opposite polarity, means for impressing upon the input circuits of said devices the amplified potential of variable polarity whereby one or the other of said devices is rendered conducting and one or the other of said pole windings is energized to produce rotation of said motor in a direction depending upon the polarity of said amplified potential.

8. A pyrometer comprising a metallic member having an electrical permeability varying with temperature, and means for determining the permeability of said member comprising, a coil, said member disposed in the electromagnetic field produced by the passage of alternating current through said coil and thereby varying the impedance of said coil in accordance with temperature; means for determining the impedance of said coil, including a balanceable bridge circuit having said coil connected in one of the arms thereof, a reactance in another arm of said bridge, a source of alternating current for energizing the bridge and its associated coil and reactance, means including a direct current energized winding for controlling the effective impedance of said reactance winding to balance said bridge with said metallic member at a predetermined temperature, and means responsive to an unbalanced condition of said bridge due to change of permeability of said metallic member in response to temperature change for rebalancing said bridge and indicating the instantaneous impedance of said coil and amount of rebalancing necessary to balance said bridge.

9. A temperature responsive device comprising a saturable core reactor having a reactance winding and a control winding, a source of alternating current for energizing the reactance winding, a source of direct current for energizing said control winding, electrical calibration means for establishing a predetermined ratio between the currents flowing in said reactance winding and said control winding, temperature responsive means for varying the current through the reactance winding, means for detecting departure from the predetermined ratio between the current in the reactance winding and in the control winding, and means operated by said detecting means for adjusting the value of current in the control winding to restore said ratio to the predetermined ratio.

10. A balanceable electrical network including a saturable core reactor having a reactance winding and a plurality of saturating windings, a magnetic core piece associated with said windings, a source of alternating current for energizing said reactance winding, a common source of direct current for energizing said saturating windings, hand adjustable electrical calibration means for selectively establishing a steady value of direct current energization through one of said saturating windings thereby establishing a predetermined ratio of current flow in the various windings, and reversible means sensitive to unbalance of said network adapted to vary the direct current energization of the other saturating winding whereby the network is rebalanced following an unbalance thereof.

11. A temperature measuring device comprising, a saturable core reactor having two reactance windings and a control saturating winding, a source of direct current for energizing said control winding, a balanceable electrical network having four arms, two opposite arms of said network each including a reactance winding of said saturable core reactor and the remaining two opposite arms each including an inductance coil, a temperature-sensitive magnetic alloy core piece for said coils to simultaneously vary the impedance of said coils in accordance with changes in temperature to unbalance said network, a source of alternating current for energizing said electrical network, a reversible electric motor adapted to vary the energization of said control winding to rebalance said network following an unbalance thereof and for indicating the temperature responsible for unbalancing the network, and means responsive to unbalance of the network controlling the reversible electric motor.

ANTHONY J. HORNFECK.